United States Patent
Li et al.

(10) Patent No.: US 10,146,045 B2
(45) Date of Patent: Dec. 4, 2018

(54) MANUFACTURING METHOD FOR WAVELENGTH CONVERSION DEVICE

(71) Applicant: APPOTRONICS CORPORATION LIMITED, Shenzhen (CN)

(72) Inventors: Qian Li, Shenzhen (CN); Yanzheng Xu, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/028,926

(22) PCT Filed: Oct. 8, 2014

(86) PCT No.: PCT/CN2014/088120
§ 371 (c)(1),
(2) Date: Apr. 12, 2016

(87) PCT Pub. No.: WO2015/055088
PCT Pub. Date: Apr. 23, 2015

(65) Prior Publication Data
US 2016/0266375 A1    Sep. 15, 2016

(30) Foreign Application Priority Data

Oct. 15, 2013 (CN) .......................... 2013 1 0479803

(51) Int. Cl.
*G02B 26/00* (2006.01)
*H05B 33/10* (2006.01)
(Continued)

(52) U.S. Cl.
CPC .......... *G02B 26/008* (2013.01); *C03C 17/001* (2013.01); *G02B 5/0242* (2013.01);
(Continued)

(58) Field of Classification Search
CPC ....................................................... F21K 9/64
See application file for complete search history.

(56) References Cited

U.S. PATENT DOCUMENTS 5,060,126 A    10/1991   Tyler et al.
6,011,662 A    1/2000    Evans
(Continued)

FOREIGN PATENT DOCUMENTS

CN    101430070 A    5/2009
CN    101539270 A    9/2009
(Continued)

OTHER PUBLICATIONS

JP2012140479, 2012, machine translation.*
(Continued)

*Primary Examiner* — Robert A Vetere
(74) *Attorney, Agent, or Firm* — Chen Yoshimura LLP

(57) ABSTRACT

Disclosed is a manufacturing method for a wavelength conversion device, comprising: preparing a plurality of wavelength conversion modules, each wavelength conversion module comprising a ceramic substrate, a reflecting layer and a fluorescent powder layer, said layers being stacked sequentially and formed into one piece; installing and fixing the plurality of wavelength conversion modules on one surface of a base substrate. By arranging different fluorescent powders respectively on the different wavelength conversion modules, a plurality of wavelength conversion modules can be produced separately at the same time, thereby significantly shortening the production cycle. Each such module is produced independently and is thus not subject to the restrictions of the characteristics of other fluorescent powders. This is beneficial for the optimization of the various processes, and a wavelength conversion device having optimal performance is thereby obtained.

15 Claims, 4 Drawing Sheets

(51) Int. Cl.
*G03B 21/20* (2006.01)
*G03B 33/08* (2006.01)
*C03C 17/00* (2006.01)
*G02B 5/02* (2006.01)

(52) U.S. Cl.
CPC ......... *G02B 5/0268* (2013.01); *G02B 5/0284* (2013.01); *G03B 21/204* (2013.01); *G03B 33/08* (2013.01); *H05B 33/10* (2013.01)

(56) References Cited

U.S. PATENT DOCUMENTS

| | | | |
|---|---|---|---|
| 8,872,208 | B2 | 10/2014 | Kawakami |
| 2002/0102411 | A1* | 8/2002 | Dillon ..................... C03C 8/14 428/426 |
| 2009/0122273 | A1 | 5/2009 | Menard et al. |
| 2009/0187234 | A1 | 7/2009 | Meyer et al. |
| 2009/0242915 | A1* | 10/2009 | Chang Chien ........ H01L 33/507 257/98 |
| 2011/0149549 | A1 | 6/2011 | Miyake |
| 2011/0210369 | A1* | 9/2011 | Daicho ................. H01L 33/505 257/98 |
| 2012/0025244 | A1* | 2/2012 | Suh, II ..................... H01L 33/46 257/98 |
| 2012/0201030 | A1 | 8/2012 | Yuan et al. |
| 2013/0037844 | A1* | 2/2013 | Hatano .............. C09K 11/7774 257/98 |
| 2013/0056775 | A1* | 3/2013 | Kawakami ................ F21V 9/16 257/98 |
| 2013/0163225 | A1* | 6/2013 | Nakatsu ............... G03B 21/204 362/84 |
| 2013/0242273 | A1 | 9/2013 | Weichmann et al. |
| 2014/0078763 | A1* | 3/2014 | Park .................... F21S 48/1104 362/510 |
| 2014/0353509 | A1* | 12/2014 | Nakatsugawa ....... G01T 1/2018 250/361 R |
| 2015/0049486 | A1 | 2/2015 | Jung et al. |

FOREIGN PATENT DOCUMENTS

| | | |
|---|---|---|
| CN | 101855581 A | 10/2010 |
| CN | 102194807 A | 9/2011 |
| CN | 102633440 A | 8/2012 |
| CN | 102800791 A | 11/2012 |
| CN | 103116204 A | 5/2013 |
| CN | 203217148 U | 9/2013 |
| CN | 203489180 U | 3/2014 |
| CN | 203489181 U | 3/2014 |
| CN | 104100933 A | 10/2014 |
| JP | 2011-129354 A | 6/2011 |
| JP | 2011-198560 A | 10/2011 |
| JP | 2012-008177 A | 1/2012 |
| JP | 2012140479 A * | 7/2012 |
| JP | 2012-185980 A | 9/2012 |
| JP | 2012-243624 A | 12/2012 |
| JP | 2013-130605 A | 7/2013 |
| TW | 201245844 A | 11/2012 |
| WO | 2007/141688 A1 | 12/2007 |
| WO | 2012/077021 A1 | 6/2012 |
| WO | 2013/137657 A1 | 9/2013 |

OTHER PUBLICATIONS

International Search Report in the parent PCT application No. PCT/CN2014/088120, dated Jan. 16, 2015.
IPRP in the parent PCT application No. PCT/CN2014/088120, dated Apr. 19, 2016.
Korean Office Action, dated May 15, 2017 in a counterpart application KR 10-2016-7012446.
Korean Office Action, dated Jun. 25, 2018 in a counterpart application KR 10-2016-7012446.
Japanese Office Action, dated May 9, 2017 in a counterpart Japanese patent application, No. JP 2016-523990.
Chinese Office Action, dated Aug. 19, 2015, and Search Report dated Aug. 11, 2015, in a counterpart Chinese patent application, No. CN 201310479803.5.
Chinese Office Action, dated Nov. 12, 2015 in a counterpart Chinese patent application, No. CN 201310479803.5.
Extended European Search Report, dated May 12, 2017 in corresponding application EP 14854843.1.
Taiwanese Office Action, dated Sep. 22, 2015, in a counterpart Taiwanese patent application, No. TW 103135343.

\* cited by examiner

MANUFACTURING METHOD FOR WAVELENGTH CONVERSION DEVICE

BACKGROUND OF THE INVENTION

Field of the Invention

This invention relates to illumination and display technologies, and in particular, it relates to a manufacturing method for a wavelength conversion device.

Description of Related Art

Wavelength conversion methods which use solid state light sources such as laser diodes (LD) or light emitting diodes (LED) to generate an excitation light to excite wavelength conversion materials such as phosphors can generate high brightness light having wavelengths different from those of the excitation light. Such light generation techniques have the advantages of high efficiency and low cost, and have become a dominating technology of existing light sources for providing white light and monochromatic lights. The light source according to this technology includes an excitation light source and a color wheel, where the color wheel includes a reflective substrate and a phosphor material layer coated on the reflective substrate, as well as a drive motor to drive the reflective substrate to rotate, so that the light spot formed by excitation light from the excitation light source on the phosphor layer acts on the phosphor layer along a circular path.

A common type of reflective substrate is a mirror-surface aluminum substrate, formed by an aluminum base and a high reflectivity layer stacked on the base. The high reflectivity layer typically uses high purity aluminum or high purity silver. The phosphor layer coated on the reflective substrate is typically formed by adhering phosphor particles using a silica gel to form a plate shape. When fabricating a multicolor integral type color wheel, because the size of the substrate is relatively large, when forming phosphor layers of different colors, the difficulty of performing blade coating of the phosphor layer in one pass is high, placing a high requirement on the blade coating process. Moreover, because phosphors of different color ranges tend to have different temperature resistance, multiple passes of blade coating and sintering are required, making the fabrication process complex and the production cycle long.

SUMMARY

The main technical problem solved by embodiments of the present invention is to provide a wavelength conversion device that has both high reflectivity and stability, as well as related manufacturing method and related light emitting devices.

To achieve these and/or other objects, as embodied and broadly described, the present invention provides a method for fabricating a wavelength conversion device, which includes:

Preparing a plurality of wavelength conversion modules, each wavelength conversion module including a ceramic substrate, a reflective layer and a wavelength conversion layer, which are sequentially stacked together forming an integral unit; and Affixing the plurality of wavelength conversion modules on a surface of a base plate.

Further, the reflective layer is a diffuse reflection layer, formed by sintering a diffusing material slurry which includes white scattering particles, a first glass powder and an organic carrier Further, the wavelength conversion layer is formed by sintering a phosphor slurry which includes a phosphor powder, a second glass powder and an organic carrier.

Further, the wavelength conversion layer is formed by curing a mixture of silica gel and a phosphor powder.

Further, the step of forming each wavelength conversion module includes:

Coating the diffusing material slurry on the ceramic substrate, and sinter it to form the diffuse reflection layer; and Coating the phosphor material slurry on the diffuse reflection layer, and sintering it to form the wavelength conversion layer, to obtain the wavelength conversion module, wherein a softening point of the first glass powder in the diffusing material slurry is higher than a softening point of the second glass powder in the phosphor material slurry.

Further, the step of forming each wavelength conversion module includes:

Coating the phosphor material slurry on a substrate, and sintering it to form the wavelength conversion layer;

Coating the diffusing material slurry on the wavelength conversion layer, and sinter it to form the diffuse reflection layer, wherein a softening point of the second glass powder in the phosphor material slurry is higher than a softening point of the first glass powder in the diffusing material slurry;

Releasing the substrate to obtain the diffuse reflection layer having the phosphor layer adhered to one side of it, and adhering or sintering another side of the diffuse reflection layer to the ceramic substrate, to obtain the wavelength conversion module.

Further, each of the first glass powder and the second glass powder is selected from a group consisting of silicate glass, lead silicate glass, aluminum borosilicate glass, aluminate glass, soda lime glass, and quartz glass, or is a mixture of two or more of the above substances.

Further, the white scattering particles are selected from aluminum oxide, titanium oxide, aluminum nitride, magnesium oxide, boron nitride, zinc oxide, zirconium oxide and barium sulfate, or are a mixture of two or more of the above substance.

Further, each wavelength conversion module includes only one color phosphor, and wherein different color phosphors are located on different wavelength conversion modules.

Further, some but fewer than all of the wavelength conversion modules are replaced by fluorescent ceramic modules, each fluorescent ceramic module including a fluorescent ceramic block and a total reflection film disposed on a bottom surface of the fluorescent ceramic block.

Further, a step of fabricating each fluorescent ceramic module includes:

Obtaining the fluorescent ceramic block; and

Coating the total reflection film on the bottom surface of the fluorescent ceramic block.

Further, the step of fabricating each fluorescent ceramic module further includes:

Coating a metal protection film over the total reflection film.

Further, each of the wavelength conversion modules or fluorescent ceramic modules is affixed on their bottom to the base plate using adhesion, soldering, or mechanical fastening means.

Further, the base plate is formed of a metal, a metal alloy, or a composite material of metal and inorganic materials.

Compared to conventional technologies, embodiments of the present invention have the following advantages:

1. Ceramic substrates or fluorescent ceramics are used to replace conventional mirror-surface metal plates. Because ceramic materials have higher melting temperatures than those of metals, they can withstand higher temperatures than metals. Also, the thermal resistance of the interface between the ceramic carrier and the phosphor materials is relatively low, so the heat generated by the phosphor materials can be conducted to the ceramic carrier and dissipated to the environment. This improves the thermal stability of the wavelength conversion device. Moreover, the thermal expansion coefficients of ceramics are relatively low, so they resist deformation even at high temperatures. Further, the thermal expansion coefficients of ceramics and the phosphor layer are close to each other, so even if there is a small amount of deformation, it does not affect the ability of the phosphor layer to adhere to the ceramic substrate.

2. It can reduce the complexity of fabrication and shorten the production cycle. On the same ceramic substrate, it is difficult to coat different phosphor layers in one pass using blade-coating, so different color phosphors need to be coated and sintered separately in multiple passes, making the production cycle long. For example, to form four phosphor layers, four cycles of coating and sintering are required.

In embodiments of the present invention, on the other hand, because different phosphors are contained in different wavelength conversion modules, which have relatively small sizes, it is easier to coat each of them using blade-coating. Also, different color phosphor layers can be sintered separately and concurrently, which shortens the production cycle. For example, to form four phosphor layers, only two sintering cycles are required in embodiments of the present invention.

3. The modular structure is more flexible, and facilitates the making of high quality wavelength conversion devices. When the reflective layer and the phosphor layers are all integrally formed on one ceramic substrate, when undergoing special processing (such as sintering, annealing, etc.), the properties and their limitations of each functional layer on the ceramic substrate must be considered (for example, a phosphor layer of red phosphor cannot withstand temperatures higher than 600 degrees C.); thus, when designing high performance color wheel with complex structures, the processing parameters have to be chosen by compromise due to these limitations, making it hard to achieve optimum result for each phosphor material and each processing technique.

In embodiments of the present invention, the different wavelength conversion modules can have sizes that are suitable for each phosphor material, and different reflective layers and heat conduction designs can be chosen as suitable for the different light emitting and heat generating properties of each phosphor, for example, ceramic with surface metal layer, thermal conductive filling particles, surface silver plating, etc. As a result, the modules for different colors can be fabricated under their respective optimum processing conditions without having to be concerned about the properties of other color modules. This is advantageous for achieving high quality color wheels.

4. It can reduce material use and lower cost. The modular wavelength conversion device design according to embodiments of the present invention also facilitates quality control of the products. For conventional color wheels, if one phosphor segment is defective, the entire color wheel has to be discarded. On the other hand, for wavelength convention devices according to embodiments of the present invention, if one wavelength convention module is defective, another module may be made as replacement, which lowers quality control cost.

DETAILED DESCRIPTION OF PREFERRED EMBODIMENTS

Embodiments of the present invention are described in detail below with reference to the drawings.

In embodiments of the present invention, a fabrication method is used to make a wavelength conversion device, the wavelength conversion device has multiple wavelength conversion modules, each module having a wavelength conversion function, such as to convert a blue excitation light to a red converted light, to convert a yellow excitation light to a green converted light, etc. The wavelength conversion devices made by such methods have various advantages. Specific embodiments are describe below.

First Embodiment

Figure 1:
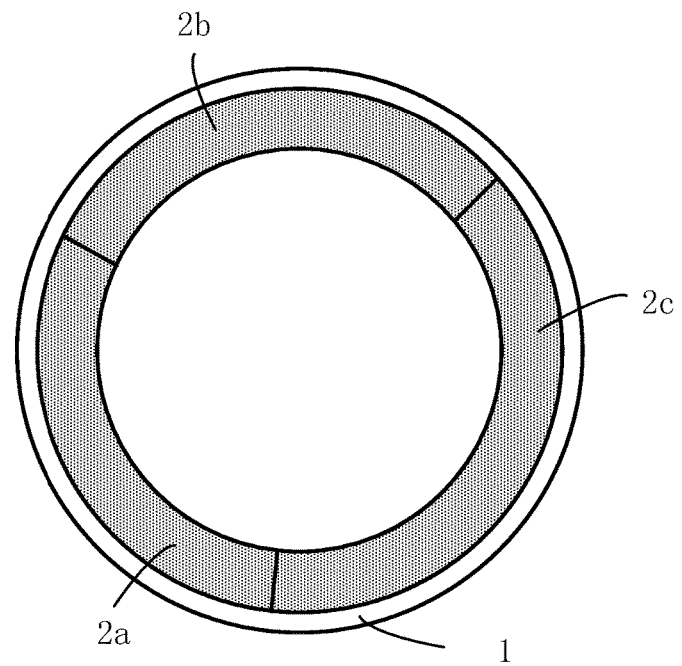
FIG. 1 schematically illustrates the structure of a wavelength conversion device fabricated using a method according to embodiments of the present invention.
Figure 3:
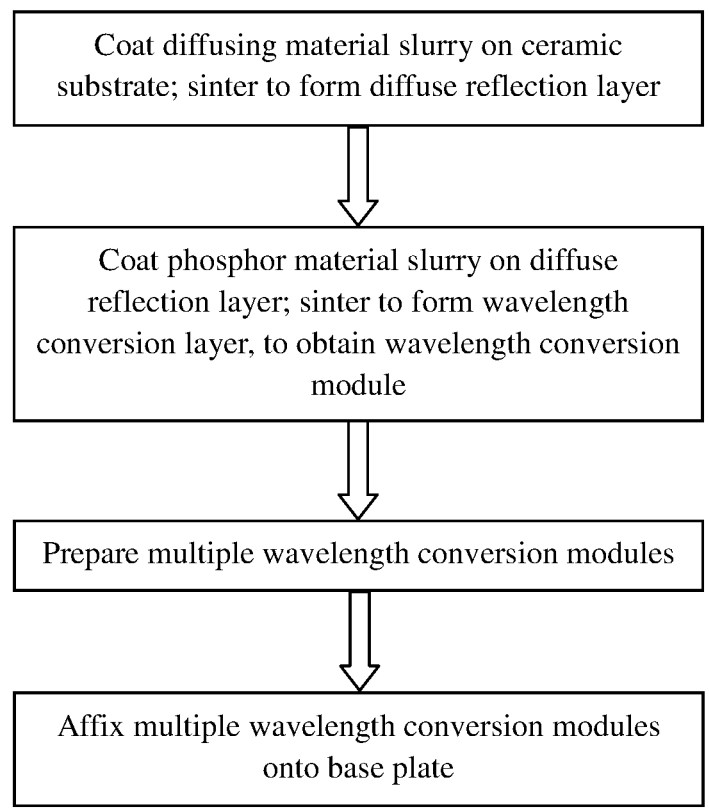
FIG. 3 schematically illustrates the flow of a wavelength conversion device fabrication method according to a first embodiment of the present invention.

Referring to FIGS. 1 and 3, the fabrication method for the wavelength conversion device includes: First, respectively prepare three wavelength conversion modules 2a, 2b and 2c, and then mount and affix the three wavelength conversion modules on one surface of a base plate 1.

The fabrication process for each wavelength conversion module 2a/2b/2c includes:

Step S1: Prepare a slurry of a diffusing material and a slurry of a phosphor material;

Step S2: Coat the diffusing material slurry on a ceramic substrate, and sinter it to form a diffuse reflection layer; and Step S3: Coat the phosphor material slurry on the diffuse reflection layer, and sinter it to form a wavelength conversion layer, to obtain the wavelength conversion module.

Figure 2:
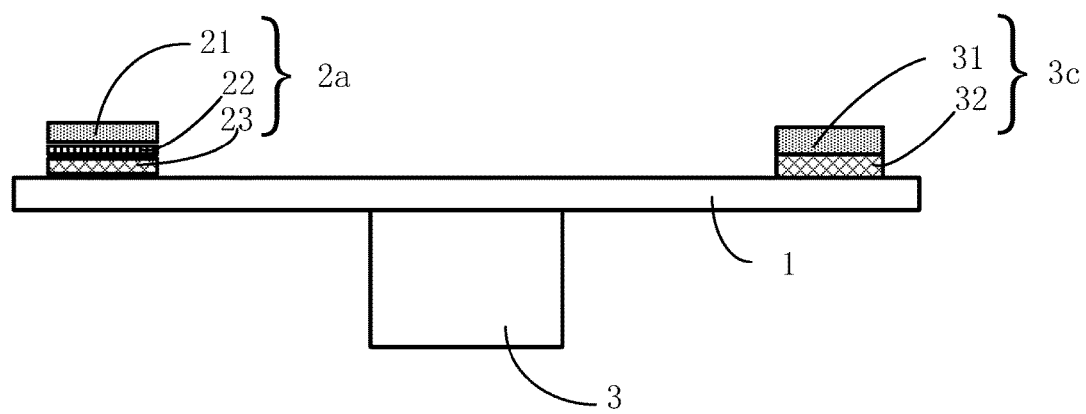
FIG. 2 schematically illustrates the structure of another wavelength conversion device fabricated using a method according to embodiments of the present invention.

The structure of the wavelength conversion module 2a, as shown in FIG. 2, includes the ceramic substrate 23, diffuse reflection layer 22 and wavelength conversion layer 21, where the three are stacked sequentially and each two adjacent layers adhere directly to each other.

In step S1, the diffusing material slurry includes a mixture of white scattering particles, a first glass powder and an organic carrier.

Here, the white scattering particles, which function to scatter incident light, is typically a powder of a salt or an oxide, and the particle size ranges from 50 nanometers to 5 microns. Examples include aluminum oxide, titanium oxide, aluminum nitride, magnesium oxide, boron nitride, zinc oxide, zirconium oxide, barium sulfate, etc. which are ultra-white single powder particles, or a mixture of two or more of the above powder particles. These white scattering material absorbs virtually no light, and are stable and will not become oxidized or decomposed under high temperature.

Because the diffuse reflection layer should have good reflectivity and heat dissipation property, a preferred choice is aluminum oxide powder which has desirable properties overall. Of course, to achieve sufficient reflection of the incident light by the diffuse reflection layer, the white scattering material in the diffuse reflection layer should have sufficient density and thickness, which can be determined through experimentation.

Glass powder is an irregularly shaped, particulate, homogeneous glass substance, which is highly transparent and has stable chemical properties. The first glass powder may be one of silicate glass, lead silicate glass, aluminum borosilicate glass, aluminate glass, soda lime glass, or quartz glass, or a mixture of two or more of the above. The first glass powder adheres the white scattering particles; after sintering, it can insulate the white scattering particles from the atmosphere, to prevent the white scattering particles from becoming damp in the air. It can also increase the strength and light transmission rate of the diffuse reflection layer. Because the first glass powder is required to be transparent to the incident light and to have good thermal conductivity, preferably, the first glass powder is borosilicate glass powder, which has stable properties and high light transmission rate, and has a relatively high thermal conductivity compared to other glass powders.

Preferably, the weight ratio of the white scattering particles to the adhesive (glass powder) is between 1:1 to 15:1. More preferably, it is between 8:1 and 12:1. Based on experiments, diffuse reflection layers obtained with such weight ratios have a reflectivity that is up to 99.5% of that of the of mirror-surface aluminum substrate, i.e., its reflectivity is almost as high as that of mirror-surface aluminum substrate. Of course, the particle size of the scattering particles, and the thickness and density of the diffuse reflection layer can be other values, which can be determined by those skilled in the art through routine experimentation.

The organic carrier is used to allow the white scattering particles and the first glass powder to be fully mixed and dispersed in the carrier. The carrier will evaporate and decompose after the high temperature sintering process, and leaves virtually no residue. Organic carriers that can be used for this purpose include phenyl silicone oil, glycol, PVB (polyvinyl butyral), ethanol, xylene, ethyl cellulose, terpineol, butyl carbitol, PVA, PAA, PEG, or a mixture of two or more of the above. The volume ratio of the organic carrier to the white scattering particles is preferably such that the latter can be uniformly mixed with the glass powder and can be fully stirred.

In step S1, the phosphor slurry includes phosphor powder, a second glass powder and an organic carrier.

The phosphor powder functions to absorb the excitation light and generate a converted light having a different wavelength than the excitation light. Examples of suitable phosphor powders include YAG (yttrium aluminum garnet) phosphor, which absorbs blue light, ultraviolet light etc. to generates a yellow converted light; or a red phosphor, which absorbs an excitation light to generate a red converted light; or a green phosphor which generates a green converted light, or other phosphors.

The second glass powder may be the same glass powder as the first glass powder, or another one of the earlier mentioned glass powders, or other glass powders. Examples of the organic carrier are the same as those mentioned earlier for the diffusing material slurry.

In step S2, the diffuse reflection slurry is first coated on the ceramic substrate and sintered, to form the diffuse reflection layer 22, where the organic carrier is evaporated during sintering. After sintering, the first glass powder bonds very strongly with the ceramic substrate 21, and can withstand high temperature.

Here, the ceramic substrate 21 has an arc shape of a certain width. Preferably, the ceramic substrate 23 is an aluminum oxide substrate, an aluminum nitride substrate, a silicon nitride substrate, a silicon carbide substrate, a boron nitride substrate, or a beryllium oxide substrate, etc., all of which are ceramic plates with a dense structure, and not porous. The thermal conductivities of these materials are above 80 W/mK, and their melting points are mostly above 200 degrees C. Thus, these materials have good thermal conductivity and at the same time can withstand high temperature. Of course, in applications that do not place a high requirement on the thermal conductivity of the ceramic substrates, other types of ceramic plates may be used as the ceramic substrate.

In step S2, the diffuse reflection layer does not have to be formed using a scattering material slurry; it can be affixed to the ceramic substrate using an adhesive. However, when using an adhesive, the existence of the adhesive means that there is an intermediate layer between the diffuse reflection layer 22 and the ceramic substrate 21, which may hinder the heat conduction from the diffuse reflection layer 22 to the ceramic substrate 21.

Thus, preferably, the diffuse reflection layer 22 uses the first glass powder and is directly sintered to the ceramic substrate 23, so that the bonding between the ceramic substrate 21 and the diffuse reflection layer 22 is strong, and heat conductivity is high. Meanwhile, the matching of the thermal expansion coefficients of glass and ceramics is better than the matching of the thermal expansion coefficients of glass and metal. Thus, as compared to a diffuse reflection layer 22 formed directly on a metal aluminum substrate, the diffuse reflection layer formed directly on the ceramic substrate is more secure and less prone to deformation or pealing. Further, because the ceramic substrate 21 has relatively high thermal conductivity coefficient, it can dissipate heat well, like a metal substrate.

In step S3, after the phosphor slurry is coated on the diffuse reflection layer, the entire structure is sintered the second time. To prevent the second sintering process from adversely impacting the diffuse reflection layer 22, the sintering temperature is preferably lower than the softening point of the first glass powder; thus, the softening point of the first glass powder is higher than that of the second glass powder.

In this embodiment, the phosphor material layer does not have to be formed using a phosphor slurry; it can be formed by coating a mixture of silica gel and the phosphor powder directly on the diffuse reflection layer, and curing it by heating. This method uses a heating temperature far below the softening point of the first glass, so it will not adversely impact the diffuse reflection layer.

A wavelength conversion module is obtained by the second sintering process or heat curing process. Steps S1, S2 and S3 may be repeated to fabricate multiple wavelength conversion modules. Then, step S4 is performed:

Step S4: Affix the multiple wavelength conversion modules simultaneously or sequentially onto the base plate 1.

Of course, the sequence of the steps can be to make one wavelength conversion module and affix it to the base plate 1, before making the next module, etc. Clearly, such a sequence is also within the scope of the invention.

Preferably, each wavelength conversion module includes only one phosphor material, i.e. its phosphor layer contains a single color phosphor material that generates a converted light of only one color, while different color phosphor materials are used on different wavelength conversion modules. In one example, the wavelength conversion modules 2a, 2b and 2c respectively contain red, yellow and orange phosphors.

In step S4, for each wavelength conversion module, the side of the ceramic substrate 23 that is opposite the diffuse reflection layer 22 is adhered to the base plate 1 using adhesion or soldering. For adhesion, preferably a high thermal conductivity adhesive is used, such as silver adhesive, or a slurry formed of a high thermal conductivity silica gel mixed with an appropriate amount of high thermal conductivity filling particles. The high thermal conductivity filling particles may be aluminum oxide, aluminum nitride, boron nitride, yttrium oxide, zinc oxide, or titanium oxide particles or a mixture of two or more of the above. This can reduce the thermal resistance between the ceramic substrate and the base plate, which enhances the temperature resistance of the wavelength conversion device. Further, the ceramic substrate can also be affixed to the base plate 1 by mechanical fastening means, such as screws, bolts or other fastening devices, or pressed to the base place by an elastic plate or by clamping.

In the embodiment of FIG. 1, the ceramic substrates of the three wavelength conversion modules are all arc shaped, and form a complete ring when they are arranged together on the base plate. Obviously, there can be different numbers of wavelength conversion modules, and they can be arranged together to form a linear shape or other shape. A ring shape is preferred because it can be driven by the motor 3 to rotate, such that the excitation light can sequentially and repeatedly illuminate different wavelength conversion modules to generate different monochromatic lights.

In step S4, the base plate 1 has a round plate shape, and is formed of a metal, a metal alloy, or a composite material of metal and inorganic materials, such as aluminum, brass, diamond-copper, etc. These metal containing materials have good thermal conductivity and mechanical strength, can function as the carrier plate of the wavelength conversion modules, and can be driven by the motor 3 to rotate.

In this embodiment, a diffuse reflection layer and ceramic substrate are used to replace conventional mirror-surface metal substrate. The diffuse reflection layer includes white scattering particles, which can scatter the incident light, so as to use diffuse reflection to replace mirror reflection of conventional metal reflective layer, to reflect the incident light. Further, white scattering particles will not change their color and property due to oxidation, decomposition or other reactions under high temperature so will not reduce its reflection of the incident light. Thus, a diffuse reflection layer can withstand relatively high temperature. Meanwhile, because the melting point of the ceramic substrate is higher than that of metal, it can withstand higher temperatures than metal, so that even after prolonged operation under high temperature, it still does not suffer significant oxidation, softening or other property changes. Thus, it can replace conventional metal substrate.

Further, using multiple wavelength convention modules to replace the conventional integral design of an aluminum substrate respectively coated with multiple phosphor layers has significant advantages.

Because different color phosphors have different physical and chemical properties, if they are all prepared on the same aluminum substrate, it is necessary to consider the process parameters suitable for each phosphor material to choose parameters through compromises, so it is difficult to obtain optimum effects for the different phosphors. In this embodiment, on the other hand, based on the temperature resistance characteristics for each phosphor material and the softening point of the corresponding glass adhesive used, each module can be separately sintered respectively.

For example, because red phosphor and orange phosphor have poorer temperature resistance, lower temperature glass powders having lower softening point should be used even though they have slightly poorer light transmission rate, so sintering may be done at a lower temperature. Yellow phosphor and green phosphor have better temperature resistance, so glass powders having higher softening points and higher light transmission rate may be used, and sintering may be done at higher temperatures. Also, for red phosphor and other phosphors that have relatively high heat generation rate, the corresponding wavelength conversion modules can selectively use high thermal conductivity ceramic substrates that have higher thermal conductivities than those for other modules, as well as superior silver adhesive, which have higher cost; and certain surface treatment process may additionally be used. On the other hand, for modules of green and yellow phosphors, lower cost materials may be used. Therefore, for the overall wavelength conversion device, satisfactory device properties are achieved while keeping the overall cost low.

Modular wavelength conversion devices also facilitate quality control. For integral color wheels, if one of the color segments is defective, the entire color wheel needs to be rejected. Using the modular structure of this embodiment, if one module is defective, a replacement module can be made individually, which reduces waste and saves quality control cost.

Second Embodiment

A difference between this embodiment and the first embodiment is that the process of fabricating the wavelength conversion modules is different. Other aspects are not described in detail here and the reader can refer to the first embodiment.

Figure 4:
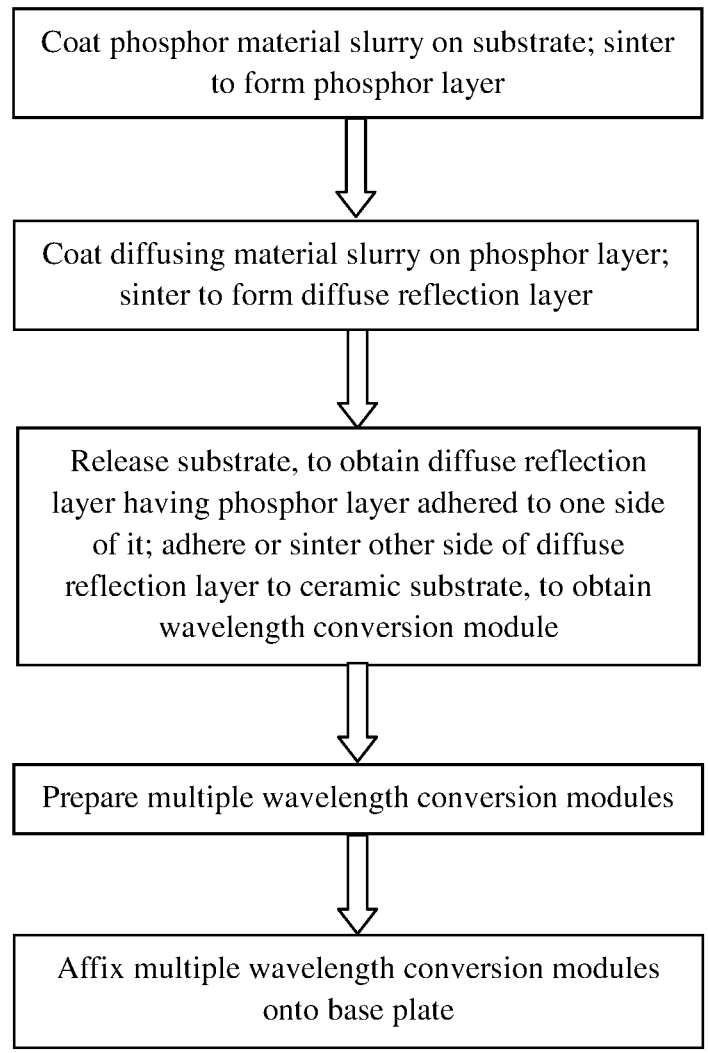
FIG. 4 schematically illustrates the flow of a wavelength conversion device fabrication method according to a second embodiment of the present invention.

As shown in FIG. 4, in this embodiment, the steps for fabricating each wavelength conversion module include:

Step P1: Prepare a slurry of a diffusing material and a slurry of a phosphor material;

Step P2: Coat the phosphor material slurry on a substrate, and sinter it to form a phosphor layer; and Step P3: Coat the diffusing material slurry on the phosphor layer, and sinter it to form a diffuse reflection layer;

Step P4: Release the substrate, to obtain the diffuse reflection layer having the phosphor layer adhered to one side of it, and adhere or sinter the other side of the diffuse reflection layer to the ceramic substrate, to obtain the wavelength conversion module.

These steps are described in detail below.

Step P1 is the same as step S1 of the first embodiment and is not described in more detail here.

In step P2, the substrate is obtained and coated with a release agent to facilitate later release of the substrate. The release agent may be any suitable high temperature resistant release agent. The substrate should have good temperature resistance so as to maintain its shape and property during sintering. Preferably, the substrate is a metal material.

In step P3, the step of sintering the diffuse reflection layer is similar to that in step S2 of the first embodiment. It should be noted that in this embodiment, in order that the sintering process of this step not adversely affect the phosphor layer, the softening point of the first glass powder of the diffusing material slurry should be lower than the softening point of the second glass powder of the phosphor slurry, i.e., the sintering temperature should be lower than the softening point of the second glass powder.

In step P4, by taking advantage of the difference in thermal expansion coefficients, the wavelength conversion module is heated and then cooled, so that the metal substrate which has a higher thermal expansion coefficient is separated from the phosphor layer, so that the substrate is released.

The first and second embodiments provide two processes for fabricating the wavelength conversion modules. In the second embodiment, the ceramic substrate only undergoes one sintering step or no sintering step, which helps to reduce changes in properties of the ceramic substrate due to sintering.

Third Embodiment

Figure 5:
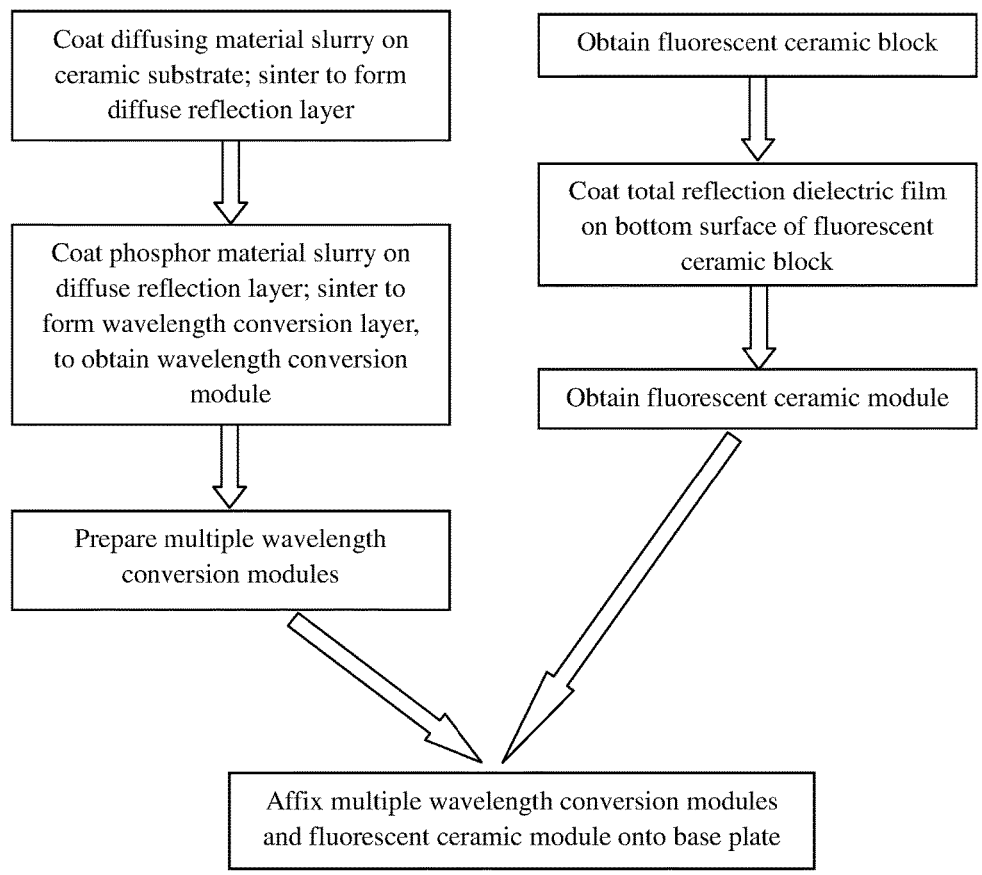
FIG. 5 schematically illustrates the flow of a wavelength conversion device fabrication method according to a third embodiment of the present invention.

A difference between this embodiment and the first and second embodiments is that, some but not all of the wavelength conversion modules are replaced by fluorescent ceramic modules. Thus, in this embodiment, as shown in FIG. 5, some of the wavelength conversion modules are fabricated by the method of the first or second embodiment, as shown on the left hand side of the flowchart, while some other wavelength conversion modules are replaced by fluorescent ceramic modules as shown on the right hand side of the flowchart.

Correspondingly, the process of fabricating the fluorescent ceramic modules includes the following steps:

Step Q1: Obtain a fluorescent ceramic block; and

Step Q2: Coat a total reflection film on the bottom surface of the fluorescent ceramic block.

Further, the process includes step Q3:

Step Q3: Coat a metal protection film over the total reflection film.

As shown in FIG. 2, a fluorescent ceramic module 3c made by such a method includes stacked fluorescent ceramic block 31, total reflection film 32 and metal protection film (not shown in the drawing).

Then step Q4 is performed:

Step Q4: Affix the one or more fluorescent ceramic modules obtained above onto the base plate, located on the same side as the other wavelength conversion modules.

In step Q1, the fluorescent ceramic block is a ceramic material that can be excited by an excitation light to generate a converted light, such as YAG glass ceramics, sintered YAG ceramics, or other systems of yellow, green or red fluorescent ceramics. Fluorescent ceramic blocks inherently have high thermal conductivities, and have sufficient strength, has good workability; thus, they inherently have the support and heat conduction functions similar to the earlier-mentioned ceramic substrates, so there is no need to use an external ceramic substrate as the carrier in this embodiment.

In this step, because a fluorescent ceramic block is used, there is no need to form a phosphor layer on the ceramic substrate but the same function and effect as in the first and second embodiments can be achieved. This simplifies the structure and the fabrication process. Meanwhile, because fluorescent ceramic block 31 has a dense structure, air cannot penetrate the fluorescent ceramic block 31 to react with the reflective film, which improves the stability of the reflective layer. Moreover, fluorescent ceramics have very high thermal conductivity, and are more suitable for illumination by a high power excitation light.

In step Q2, the total reflection film is a high reflectivity functional layer, such as silver film, aluminum film, etc., and can be formed by electron beam sputtering, plasma sputtering, vapor deposition, etc. on the bottom surface of the fluorescent ceramic block.

In step Q3, a metal protection film may be coated over the total reflection film on the fluorescent ceramic block, using a coating method mentioned above. The metal protection film may be a metal such as Ti, Ni, Cu, Al, or Mo, or a mixed film of two or more of the above metals. Or, the film may be a composite film formed by alternating coatings of multiple metals. The function of the metal protection film is to protect the reflective layer as well as to facilitate adhesion with the base plate, in particular when the adhesion uses soldering.

Obtaining the total reflection film by coating is a preferred method in this embodiment. The coating process tends to be complex and costly; thus, in practice, when cost is a concern, the reflective layer may be replaced by a diffuse reflection layer, which can be formed by sintering the above-described diffusing material slurry layer on the surface of the fluorescent ceramic block.

Or, the total reflection film may be formed by curing a mixture of silica gel and white scattering particles. Such a mixture is coated on the bottom surface of the fluorescent ceramic block, and adhered to the base plate; after curing the parts are adhered together to form an integral piece. This can greatly reduce the temperature of the process.

Step Q4 may use the same method as described in other embodiments to affix the wavelength conversion modules to the base plate, and detailed descriptions are omitted here. In this embodiment, the method of adhering the total reflection film or the metal protection film to the base plate preferably uses low temperature vacuum brazing. This can reduce the air cavities and thickness of the soldering layer, which enhances heat conduction.

In step Q4, when there are multiple fluorescent ceramic blocks, they may contain the same monochromatic phosphor material; or preferably, different fluorescent ceramic blocks contain different monochromatic phosphor materials, to generate converted light of different colors. Meanwhile, based on the different phosphor materials, correspondingly, different total reflection films or diffuse reflection layers may be used, and different optimum fabrication process and conditions may be employed respectively, to respectively obtain optimum wavelength conversion modules.

Fourth Embodiment

Based on the third embodiment, this embodiment includes reflective modules, in addition to the wavelength conversion modules and fluorescent ceramic modules.

The reflective module includes a metal substrate, which is coated with a high reflectivity reflection film, such as a silver film, aluminum film, etc. Or, the metal substrate can be coated with a diffuse reflection layer by curing a mixture of white scattering particles and silica gel. Although silica gel has relatively poor thermal stability, the module has a pure diffuse reflection layer which generates little heat, so even under high power, it can still meet the application requirements. The silica gel reflection layer is low cost which achieves cost control. Similarly, the reflective module can also be achieved by forming a diffuse reflection layer on a ceramic substrate.

In one example of this embodiment, the wavelength conversion device has three wavelength conversion modules, two fluorescent ceramic modules, and one reflective module, all of which are arc shaped, and are arranged and affixed to the base plate to form a complete ring shape.

Thus, in this embodiment, the three wavelength conversion modules are respectively fabricated concurrently using steps S1, S2 and S3, or using steps P1, P2, P3 and P4; concurrently, the two fluorescent ceramic modules are respectively fabricated using steps Q1, Q2 and Q3; and the one reflective module is also fabricated. Finally, all of the above modules are arranged in a desired arrangement and affixed to the base plate to form an integral piece.

Because the different types of modules and the different modules of the same type can be fabricated separately and simultaneously, the production cycle is greatly reduced, and fabrication efficiency is increased. Meanwhile, the different modules can be fabricated concurrently under their different respective conditions, without interfering with each other, which enables them to be fabricated using the respective optimum processes to obtain optimum modules, so that the quality of the product is improved.

The various embodiments of the invention are described in this disclosure in a progressive manner; each embodiment is described by focusing on its difference from other embodiments, while identical or similar aspects of the different embodiments can be understood by referring to other embodiments.

It will be apparent to those skilled in the art that various modification and variations can be made in the wavelength conversion device and related fabrication method of the present invention without departing from the spirit or scope of the invention. Thus, it is intended that the present invention cover modifications and variations that come within the scope of the appended claims and their equivalents.

What is claimed is:

1. A method for fabricating a wavelength conversion device, comprising:
   separately preparing a plurality of wavelength conversion modules, each wavelength conversion module including a ceramic substrate, a reflective layer and a wavelength conversion layer, which are sequentially stacked together forming an integral unit, wherein the wavelength conversion layers of at least some of the plurality of wavelength conversion modules include wavelength conversion materials that are different from each other; and
   affixing the plurality of wavelength conversion modules that have been separately prepared on a surface of a common base plate.

2. The method of claim 1, wherein the reflective layer is a diffuse reflection layer, formed by sintering a diffusing material slurry which includes white scattering particles, a first glass powder and an organic carrier.

3. The method of claim 2, wherein the wavelength conversion layer is formed by sintering a phosphor slurry which includes a phosphor powder, a second glass powder and an organic carrier.

4. The method of claim 3, wherein the step of forming each wavelength conversion module includes:
   coating the diffusing material slurry on the ceramic substrate, and sinter it to form the diffuse reflection layer; and
   coating the phosphor material slurry on the diffuse reflection layer, and sintering it to form the wavelength conversion layer, to obtain the wavelength conversion module, wherein a softening point of the first glass powder in the diffusing material slurry is higher than a softening point of the second glass powder in the phosphor material slurry.

5. The method of claim 3, wherein the step of forming each wavelength conversion module includes:
   coating the phosphor material slurry on a substrate, and sintering it to form the wavelength conversion layer;
   coating the diffusing material slurry on the wavelength conversion layer, and sinter it to form the diffuse reflection layer, wherein a softening point of the second glass powder in the phosphor material slurry is higher than a softening point of the first glass powder in the diffusing material slurry;
   releasing the substrate to obtain the diffuse reflection layer having the phosphor layer adhered to one side of it, and adhering or sintering another side of the diffuse reflection layer to the ceramic substrate, to obtain the wavelength conversion module.

6. The method of claim 3, wherein each of the first glass powder and the second glass powder is selected from a group consisting of silicate glass, lead silicate glass, aluminum borosilicate glass, aluminate glass, soda lime glass, and quartz glass, or is a mixture of two or more of the above substances.

7. The method of claim 2, wherein the white scattering particles are selected from aluminum oxide, titanium oxide, aluminum nitride, magnesium oxide, boron nitride, zinc oxide, zirconium oxide and barium sulfate, or are a mixture of two or more of the above substance.

8. The method of claim 1, wherein the wavelength conversion layer is formed by curing a mixture of silica gel and a phosphor powder.

9. The method of claim 1, wherein each wavelength conversion module includes only one color phosphor, and wherein different color phosphors are located on different wavelength conversion modules.

10. The method of claim 1, further comprising:
    preparing one or more fluorescent ceramic modules, each fluorescent ceramic module including a fluorescent ceramic block and a total reflection film disposed on a bottom surface of the fluorescent ceramic block; and
    affixing the fluorescent ceramic modules along with the wavelength conversion modules on the surface of the base plate.

11. The method of claim 10, wherein a step of fabricating each fluorescent ceramic module includes:
    obtaining the fluorescent ceramic block; and
    coating the total reflection film on the bottom surface of the fluorescent ceramic block.

12. The method of claim 11, wherein the step of fabricating each fluorescent ceramic module further includes:
    coating a metal protection film over the total reflection film.

13. The method of claim 10, wherein each of the wavelength conversion modules or fluorescent ceramic modules is affixed on their bottom to the base plate using adhesion, soldering, or mechanical fastening means.

14. The method of claim 1, wherein each of the wavelength conversion modules or fluorescent ceramic modules is affixed on their bottom to the base plate using adhesion, soldering, or mechanical fastening means.

15. The method of claim 1, wherein the base plate is formed of a metal, a metal alloy, or a composite material of metal and inorganic materials.

* * * * *